Aug. 30, 1927.  
J. E. MITCHELL  
COTTON EXTRACTING AND CLEANING MACHINE  
Filed Jan. 4, 1926
1,640,420
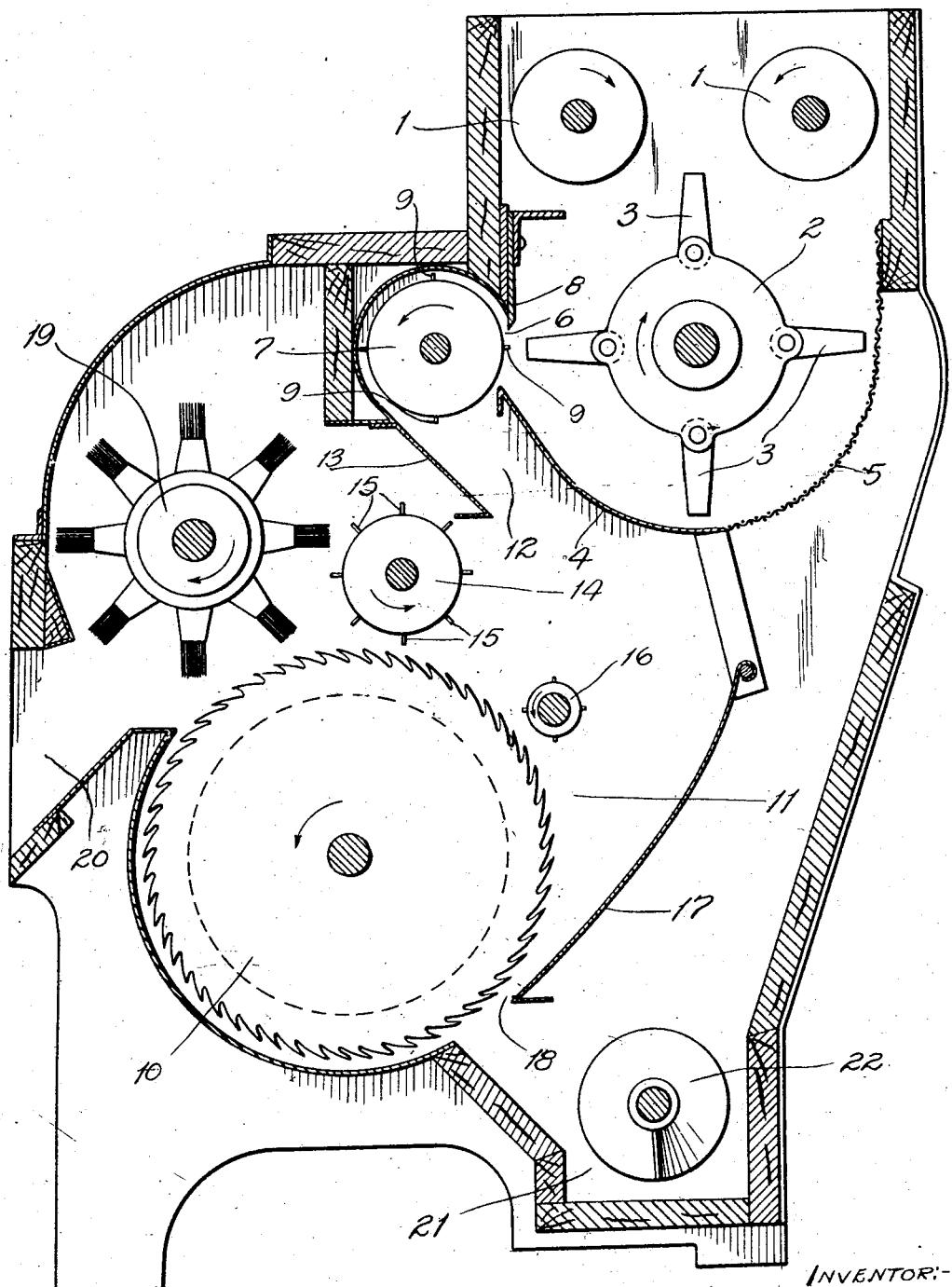
INVENTOR:-  
JOHN E. MITCHELL.  
By
ATTORNEY.

Patented Aug. 30, 1927.

1,640,420

UNITED STATES PATENT OFFICE.

JOHN E. MITCHELL, OF ST. LOUIS, MISSOURI.

COTTON EXTRACTING AND CLEANING MACHINE.

Application filed January 4, 1926. Serial No. 79,084.

This invention relates to certain new and useful improvements in cotton extracting and cleaning machines of the general type illustrated in various prior patents granted to me, of which Patent No. 1,426,588, dated August 22nd, 1922, will serve as an illustration. All of the machines illustrated in these prior patents have, as essential features, a rotating saw cylinder, a hull board defining the size of a space for the discharge of hulls past one side of the saw cylinder, a doffer for removing the cotton from the opposite side of the saw cylinder, and a kicker roll mounted between the doffer and the hull board and rotated against the cotton carried through by the saw cylinder, so as to knock back any hulls carried up by the cotton.

One of the problems that has presented itself in the arrangement of these essential parts above referred to is the proper location of the kicker roll relative to the saw cylinder. By reason of the fact that it is not practicable to feed the mixed cotton and hulls to the saw cylinder in a perfectly even or uniform stream, so that each lock of cotton will be firmly engaged by the teeth of the saw cylinder, the kicker roll, if mounted close enough to the saw cylinder to prevent any hulls going through with the cotton, will also kick back some cotton with the hulls, and since this cotton may return a number of times to the kicker roll before it is finally engaged firmly enough to be carried through beneath the roller rotating against it, the working chamber in which the parts operate will soon fill up with this accumulated cotton, thus reducing the capacity of the machine by limiting the amount which can be fed into the working chamber.

On the other hand, if the kicker roll is set far enough away from the saw cylinder so as to prevent kicking back the cotton with the hulls, it will allow a large percentage of the hulls to pass under the kicker roll with the cotton, which hulls go into the gin and very materially lower the grade of the lint.

According to the present invention, with the object in view of overcoming this objection and of obtaining a more perfect separation between the hull particles and cotton, I employ two kicker rolls, in connection with the saw cylinder, or with each saw cylinder if a double saw arrangement such as shown in my prior patent referred to is employed, and locate them as in the case of the single kicker roll, between the hull board and the doffer in such manner as to very greatly reduce, if not altogether to overcome, the throwing back of the cotton with the hulls at the separating point between the kicker rolls and the saw teeth. These kicker rolls are located one above the other in unobstructed relation in the working chamber, and the lower roll is located a greater distance away from the surface of the saw cylinder than the upper kicker roll. The lower kicker roll is preferably of smaller diameter than the upper kicker roll, and while both kicker rolls are ordinarily of the same general construction, the lower kicker roll may be a rotary member of any suitable construction so long as it rotates against the cotton carried up by the saw cylinder. For convenience of description, however, I will refer to the lower member as a kicker roll, as it would almost invariably be of that form; that is to say, having its surface provided with blades to knock back the hulls.

A characteristic feature of the invention is the fact that the operating face of the saw cylinder and the two kicker rolls work in a chamber which is otherwise unobstructed, so that there is at all times a space free from obstruction from the inlet to the working chamber at the top thereof to its outlet past the saw cylinder at the bottom of the chamber. Thus, the mixed cotton and hulls are not impeded in their feeding movement and are brought into contact with the saw cylinder solely by the force of gravity, and such locks and hulls as are not carried up by the saw are free to be thrown back into the working chamber, which arrangement prevents overcrowding of the saw cylinder and also crushing or cutting of the hulls by the saw teeth, which would otherwise result if there were any part in the working chamber between which and the surface of the saw cylinder the body of cotton and hulls in the working chamber could become wedged or compressed. Furthermore, this arrangement, combined with the relative location of the kicker rolls as hereinafter described, permits the hulls and cotton particles knocked back by the upper kicker roll to be thrown over and beyond the lower kicker roll into the stream of the mixed cotton and hulls passing into the working chamber, so that detached hull particles may escape out of the outlet from said chamber and the cotton particles again be carried up by the saw cylinder, thus providing a continuous and progressive separation between the cotton and hulls by the same set of separating members, namely, the saw cylinder and the kicker rolls. Such an arrangement, as will be seen, is of the utmost simplicity and enables me to accomplish a separation between the cotton and hulls to a degree which, so far as I am aware, has never heretofore been attained in a single machine, and which, prior to my invention, could only have been accomplished by successive treatments of the cotton in a series of machines. Machines for accomplishing this object have been suggested and some of them patented; but these are of such a complicated construction as to be almost prohibitive in cost, and no one of them has, to my knowledge, gone into commercial use. In my opinion, aside from the cost involved, the lack of success of all such machines is due to the fact, principally, that in no one of them is there provided the successive and progressive separation between the cotton and hulls in a working chamber which is free from obstruction, so that the body of mixed cotton and hulls, and individual hull and cotton locks, is and are free to move in said working chamber both in the feeding movement and under impact of the teeth of the saw cylinder therewith.

The invention is illustrated in the accompanying drawing in which—

The figure is a vertical section through a machine constructed according to my invention, and showing a preferred embodiment thereof.

Referring to the drawing, the numerals 1 indicate two feed rollers which operate to pass mixed cotton and bolls to the boll breaking cylinder 2, having pivoted arms 3 and revolving in a casing 4, one side of which carries a screen 5 of wire mesh through which dirt and small particles of hulls may pass. The casing 4 has an outlet 6 located opposite to the screen, the size of which is determined by a picker roll 7, operating in proximity to one edge of a bar 8, and which roll carries pins or pickers 9 and rotates in the direction of the arrow. This picker roll operates to withdraw the cotton and the broken bolls as the latter are reduced by the breaking cylinder, and to deliver the mixed product to the cotton separating mechanism. This mechanism will now be described.

Mounted to rotate within the main casing of the machine is a saw cylinder 10, the operating face of which works in and forms a boundary for the lower part of a working chamber 11. The cotton and hull particles are directed by the picker roll through a feed opening 12, which is formed by an upper hull board 13 and the casing 4 of the boll breaking cylinder. Co-operating with the saw cylinder 10 and located above the same is a kicker roll 14 having blades 15 for knocking back the hulls. Located below the kicker roll 14 to one side of the saw cylinder is a second kicker roll 16, which is preferably of considerably smaller diameter than the kicker roll 14 and is located at a greater distance from the surface of the saw cylinder than said upper kicker roll. In practice, I position the kicker rolls, relative to the surface of the saw cylinder, so that the upper kicker roll will be separated from the surface of the saw cylinder by a distance of about one-quarter of an inch, and the lower kicker roll, by a distance of about one-half an inch. The numeral 17 indicates a hull board, the lower end of which defines the size of an opening 18, constituting an outlet from the working chamber 11 past the saw cylinder. The numeral 19 indicates a doffer which operates to remove cotton from the saw cylinder and discharge it through an opening 20 in the casing. Hull particles passing through the opening 18 fall into a trough 21 provided in the lower part of the casing of the machine, and are continuously moved therefrom by a worm conveyor 22.

As will be seen from the drawing, the working chamber 11 provides an unobstructed space in which the saw cylinder and kicker rolls operate and which, moreover, is continuous from the inlet opening 12 to the outlet opening 18.

In operation, the mixed cotton and hulls are fed as uniformly as possible into the working chamber 11 beneath the lower kicker roll 16, the loose or disengaged hulls being discharged immediately through the opening 18. The cotton, however, and the hulls entangled with the same will be carried by the saw cylinder up to the first separating point between the teeth of the saw cylinder and the kicker roll 16. This roll is set too far away from the saw cylinder to kick back any cotton except the large surplus quantity which may come intermittently by reason of unevenness in feed. In other words, with a normal and uniform feed, the cotton not only passes very freely through the space between the saw cylinder and the kicker roll 16, but the rotation of this roll drives the cotton firmly onto the teeth of the saws. While this roll is set too far away from the saw cylinder to prevent the passage of all hulls between it and the saw cylinder, it does kick back a large proportion of the hulls which, after being freed from the cotton, slide down the hull board 17 and are discharged from the machine. The cotton which passes the kicker roll 16 is firmly fixed upon the teeth of the saws, so that only a comparatively few locks of cotton work loose and are kicked back by the second kicker roll 14, although the latter, as stated, is set to rotate much closer to the saw cylinder; in fact, close enough to separate and kick back the remaining small hulls and pieces of hulls carried by the cotton through the first separating space between the saw cylinder and the lower kicker roll 16. The hulls, or pieces of hulls, separated from the cotton and thrown back by the upper kicker roll 14 are thrown thereby entirely over the top of and beyond the first or lower kicker roll 16, and being entirely free from any entanglement with the cotton, they are readily discharged from the machine with the hulls thrown back by said lower kicker roll. The few locks of cotton which may be thrown back with the hulls separated by the upper kicker roll are likewise thrown with the hulls over the lower kicker roll, but are caused by the hull board 17 to be re-engaged by the saw cylinder beneath the lower kicker roll and brought back through the separating points beneath the two kicker rolls, whence it is seldom, if ever kicked back the second time. In other words, after the cotton has once been firmly forced onto the teeth of the saw cylinder, the upper kicker roll can be rotated close enough to the saw cylinder to prevent the passage of practically all of the hulls and pieces of hulls through the separating space between it and the saw cylinder without, at the same time, throwing back any appreciable amount of the cotton.

In my prior Patent, No. 1,332,911, dated March 9th, 1920, I disclose the use of a stationary angle bar located over the saw cylinder in advance of the kicker roll, for causing the cotton to be firmly engaged by the teeth of the saw. The objection to the use of any stationary device, however, is that it does not, of course, kick back the hulls, and does not even prevent the larger hulls from passing beneath it. These, however, are ground between the bar and the teeth of the saw cylinder, making small pieces of hulls and shale that are very difficult to remove from the cotton. The advantage of causing the cotton to be firmly engaged by the teeth of the saw is obtained in the practice of the present invention, while the disadvantages incident to a stationary member such as described in my prior patent are overcome. This is due to the arrangement described, whereby two kicker rolls are located in an unobstructed working chamber to operate in connection with that portion of the saw cylinder between the hull board and the doffer, and so positioned that the hulls knocked back by the upper kicker roll will be thrown entirely over and beyond the lower kicker roll, which operation is facilitated by making the lower kicker roll of much less diameter than the upper kicker roll. The width of the separating spaces between these kicker rolls and the saw cylinder may vary, but, in general, I prefer to make the separating space between the blades of the upper kicker roll and the saw cylinder approximately one-half that of the space between the blades of the lower kicker roll and the saw cylinder.

It has been found, in practice, that with the arrangement of separating members such as described, not only is the capacity of the saw cylinder for handling the cotton very materially increased, but a vast improvement results in the degree of separation of the hulls and other extraneous matter from the cotton. In fact, a machine of this character operating with a single saw cylinder will give about the same result that will be obtained if all of the cotton were run through two different machines, each with a single kicker roll, the kicker roll in the first machine set high enough to take out the large hulls, and the kicker roll in the second machine set close enough to take out what small hulls and hull particles may have escaped extraction in the first machine.

In the interest of brevity, I have shown and described the present invention as applied to a machine having a single saw cylinder. I wish it understood, however, that I contemplate the use of the invention in connection with a double saw cylinder machine, such as shown in my prior Patent No. 1,426,588, referred to above, in which case the arrangement of the kicker rolls, herein described with reference to one saw cylinder, would be duplicated with the second saw cylinder.

I claim:

1. In a cotton cleaning machine affording a working chamber having a free passage for hulls from an inlet at the top to an outlet at the bottom, a saw cylinder operating in said chamber and past which the outlet from said chamber extends, and a pair of kicker rolls located in said chamber in unobstructed relation to each other to co-operate with said saw cylinder in knocking back hulls in cotton carried around by the latter, the one being located above the other, and the lower kicker roll being positioned at a greater distance from the surface of the saw cylinder than the upper.

2. In a cotton cleaning machine affording a working chamber having a free passage for hulls from an inlet at the top to an outlet at the bottom, a saw cylinder operating in said chamber, a doffer co-operating with said saw cylinder, a hull board forming the boundry of one part of said working chamber and the lower edge of which defines the size of an opening past said saw cylinder constituting the outlet from said working chamber, and a pair of kicker rolls located in unobstructed relation to each other in said chamber between said hull board and the doffer to co-operate with said saw cylinder in knocking back hulls in cotton carried around by the latter, and positioned one above the other in such relation that the hulls knocked back by the upper kicker roll will be thrown over and beyond the lower kicker roll.

3. In a cotton cleaning machine affording a working chamber having a free passage for hulls from an inlet at the top to an outlet at the bottom, a saw cylinder operating in said chamber, a doffer co-operating with said saw cylinder, a hull board forming the boundary of one part of said working chamber and the lower edge of which defines the size of an opening past said saw cylinder constituting the outlet from said working chamber, and a pair of kicker rolls located in unobstructed relation to each other in said chamber between said hull board and doffer to co-operate with said saw cylinder in knocking back hulls in cotton carried around by the latter, the one being located above the other and the lower kicker roll being positioned at a greater distance from the surface of the saw cylinder than the upper.

4. In a cotton cleaning machine affording a working chamber having a free passage for hulls from an inlet at the top to an outlet at the bottom, a saw cylinder operating in said chamber, a doffer co-operating with said saw cylinder, a hull board forming the boundary of one part of said working chamber and the lower edge of which defines the size of an opening past said saw cylinder constituting the outlet from said working chamber, and a pair of kicker rolls located in unobstructed relation to each other in said chamber between said hull board and the doffer to co-operate with said saw cylinder in knocking back hulls in cotton carried around by the latter, and positioned one above the other in such relation that the hulls knocked back by the upper kicker roll will be thrown over and beyond the lower kicker roll, and the lower kicker roll being positioned at a greater distance from the surface of the saw cylinder than the upper.

5. In a cotton cleaning machine affording a working chamber having a free passage for hulls from an inlet at the top to an outlet at the bottom, a saw cylinder, the operating face of which forms the boundary of a part of said working chamber, and a pair of kicker rolls located in unobstructed relation to each other in said chamber to co-operate with said saw cylinder in knocking back hulls in cotton carried around by the latter, the one being located above the other, and the lower kicker roll being of less diameter than the upper kicker roll and positioned at a greater distance from the surface of the saw cylinder.

6. In a cotton cleaning machine affording a working chamber having a free passage for hulls from an inlet at the top to an outlet at the bottom, a saw cylinder, the operating face of which forms the boundary of a part of said working chamber, and a pair of kicker rolls located in unobstructed relation to each other in said chamber to co-operate with said saw cylinder in knocking back hulls in cotton carried around by the latter, the one being located above the other and so positioned relative to each other that the hulls knocked back by the upper kicker roll will be thrown over and beyond the lower kicker roll, and the lower kicker roll being of less diameter than the upper kicker roll and positioned at a greater distance from the surface of the saw cylinder.

7. In a cotton cleaning machine affording a working chamber having a free passage for hulls from an inlet at the top to an outlet at the bottom, a saw cylinder, the operating face of which forms the boundary of a part of said working chamber, and a pair of kicker rolls located in unobstructed relation to each other in said chamber to co-operate with said saw cylinder in knocking back hulls in cotton carried around by the latter, the one being located above the other, and the lower kicker roll being positioned at a greater distance from the surface of the saw cylinder than the upper kicker roll, said chamber providing an unobstructed space common to the two kicker rolls and of which said passage is a part.

8. In a cotton cleaning machine affording a working chamber having a free passage for hulls from an inlet at the top to an outlet at the bottom, a saw cylinder, the operating face of which forms a boundary for a part of said chamber, a pair of kicker rolls located in unobstructed relation to each other in said chamber to co-operate with said saw cylinder in knocking back hulls in cotton carried around by the latter, the one being located above the other, the lower kicker roll being positioned at a greater distance from the surface of the saw cylinder than the upper kicker roll, means for feeding mixed cotton and hulls into said chamber, the latter affording an unobstructed space common to the two kicker rolls and of which said passage is a part, and a hull board forming the boundary of another part of said working chamber, the lower end of which defines the size of an opening past the saw cylinder constituting the outlet for hulls from said working chamber.

9. In a cotton cleaning machine affording a working chamber having a free passage for hulls from an inlet at the top to an outlet at the bottom, a saw cylinder, the operating face of which forms a boundary for a part of said chamber, a pair of kicker rolls, located in unobstructed relation to each other in said chamber to co-operate with said saw cylinder in knocking back hulls in cotton carried around by the latter, the one being positioned above the other in such relation that the hulls knocked back by the upper kicker roll will be thrown over and beyond the lower kicker roll, means for feeding mixed cotton and hulls into said chamber, the latter affording an unobstructed space common to the two kicker rolls and of which said passage is a part, and a hull board forming the boundary of another part of said working chamber, the lower end of which defines the size of an opening past the saw cylinder constituting the outlet for hulls from said working chamber.

10. In a cotton cleaning machine affording a working chamber, a saw cylinder, the operating face of which forms the boundary for one part of said chamber, a kicker roll located in said chamber to co-operate with said saw cylinder in knocking back hulls in cotton carried around by the latter, a rotary member also located in said working chamber in unobstructed relation with said kicker rolls and in co-operative relation with said saw cylinder but positioned at a greater distance from the surface of the latter than the kicker roll, and a hull board, the lower end of which defines the size of an outlet from said working chamber past said saw cylinder at a point below that at which said rotary member is positioned.

11. In a cotton cleaning machine affording a working chamber, having a free passage for hulls from an inlet at the top to an outlet at the bottom, a saw cylinder, the operating face of which forms the boundary for one part of said chamber, a kicker roll located in said chamber to co-operate with said saw cylinder in knocking back hulls in cotton carried around by the latter, a rotary member also located in said working chamber in unobstructed relation with said kicker rolls and in co-operative relation with said saw cylinder and positioned below said kicker roll and in such relation thereto that the hulls knocked back by said kicker roll will be thrown over and beyond said rotary member, and a hull board, the lower end of which defines the size of the outlet from said workig chamber past said saw cylinder at a point below that at which said rotary member is positioned.

12. In a cotton cleaning machine affording a working chamber having a free passage for hulls from an inlet at the top to an outlet at the bottom, a saw cylinder, the operating face of which defines the boundary of one part of said chamber, a pair of kicker rolls located in said chamber in unobstructed relation to each other and adapted to co-operate with said saw cylinder in knocking hulls back from the cotton removed from said working chamber by the saw cylinder, one being located above the other and the lower kicker roll being positioned at a greater distance from the surface of the saw cylinder than the upper kicker roll, a hull board, the lower end of which defines the size of the outlet from said working chamber past the saw cylinder at a point below that at which the lower kicker roll is positioned, and means for feeding mixed cotton and hulls into said chamber, the latter affording an unobstructed space from the feeding point of the mixed cotton and hulls to said outlet opening, constituting a path for the mixed cotton and hulls fed into the chamber and for the hulls knocked back by said kicker rolls.

13. In a cotton cleaning machine affording a working chamber, a saw cylinder, the operating face of which defines the boundary of one part of said chamber, a pair of kicker rolls located in unobstructed relation to each other in said chamber to co-operate with said saw cylinder in knocking hulls back from the cotton removed from said working chamber by the saw cylinder, one being located above the other in such relation that the hulls knocked back by the upper kicker roll will be thrown over and beyond the lower kicker roll, a hull board, the lower end of which defines the size of an outlet from said working chamber past the saw cylinder at a point below that at which the lower kicker roll is positioned, and means for feeding mixed cotton and hulls into said chamber, the latter affording an unobstructed space from the feeding point of the mixed cotton and hulls to said outlet opening, constituting a path for the mixed cotton and hulls fed into the chamber and for the hulls knocked back by said kicker rolls.

In testimony whereof, I have hereunto set my hand.

JOHN E. MITCHELL.